Feb. 22, 1966 L. W. GATES ETAL 3,236,038
ROTARY PICKUP FOR TOMATO HARVESTER
Filed April 8, 1964 7 Sheets-Sheet 1

INVENTORS
AMIL A. ANDRES
LAUREN W. GATES
BY
Owen, Wickersham & Erickson
ATTORNEYS

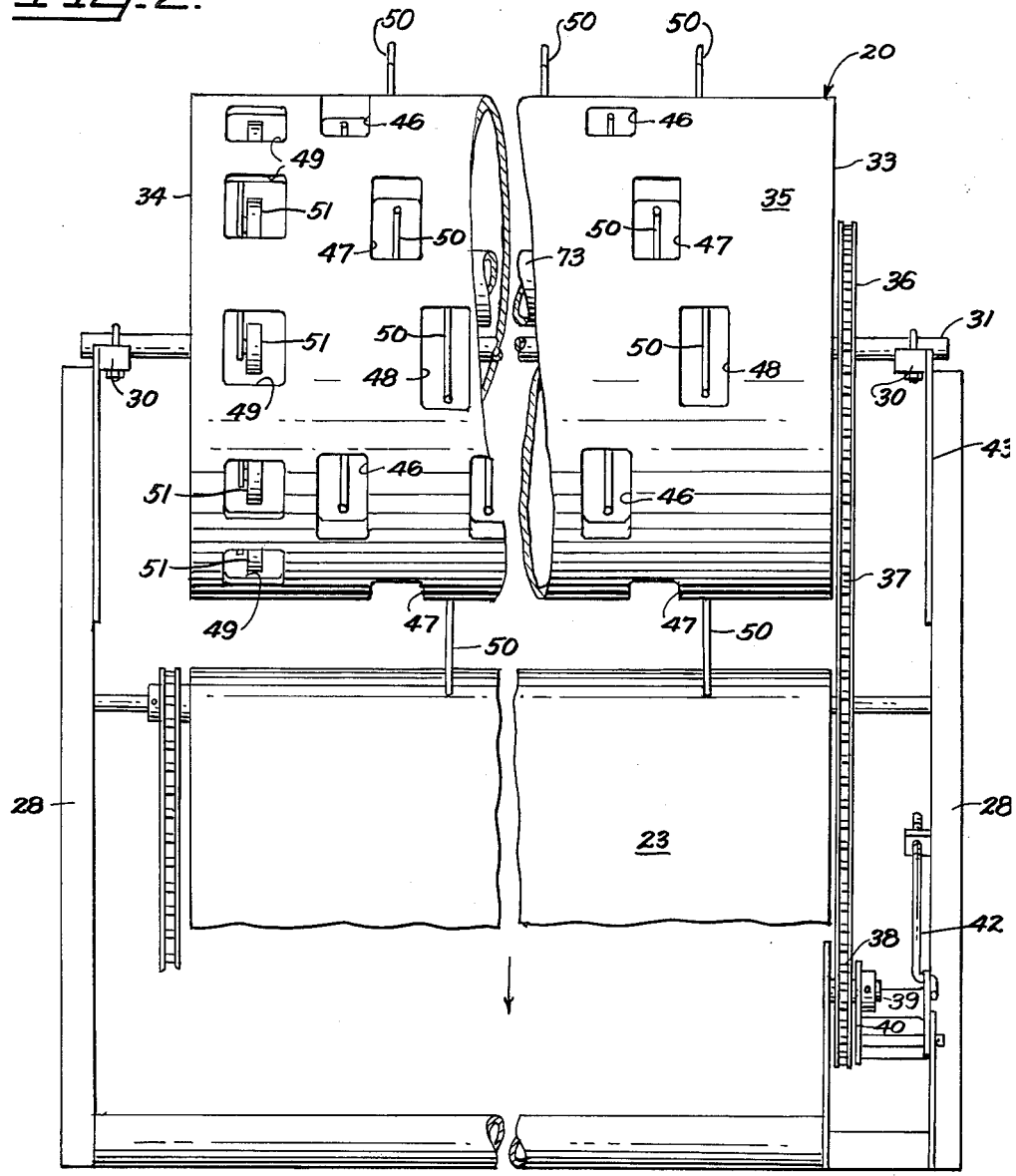

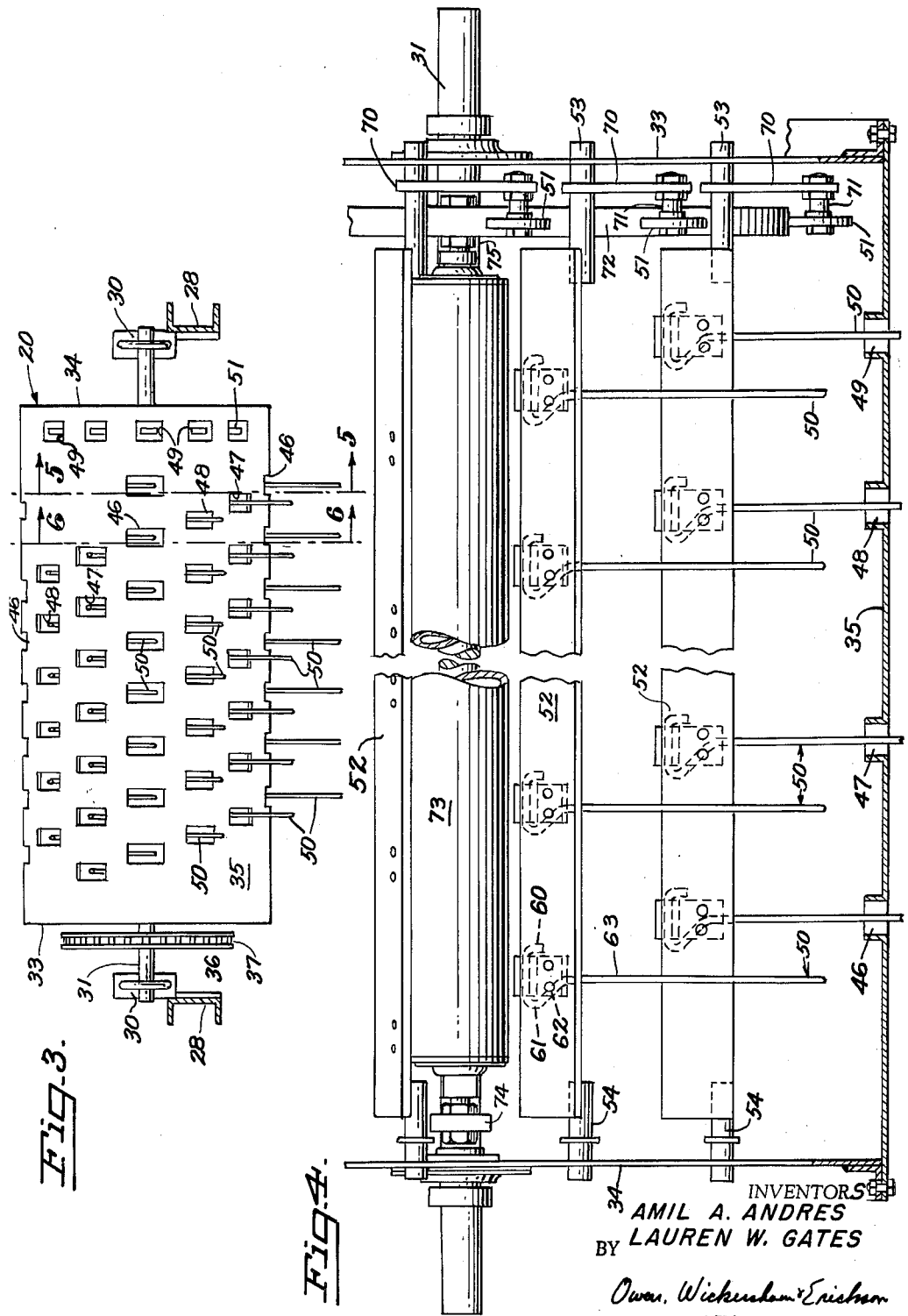

Feb. 22, 1966   L. W. GATES ETAL   3,236,038
ROTARY PICKUP FOR TOMATO HARVESTER
Filed April 8, 1964   7 Sheets-Sheet 4

INVENTORS
AMIL A. ANDRES
LAUREN W. GATES
BY
Owen, Wickersham & Erickson
ATTORNEYS INVENTORS
AMIL A. ANDRES
LAUREN W. GATES
BY
Owen, Wickersham & Erickson
ATTORNEYS

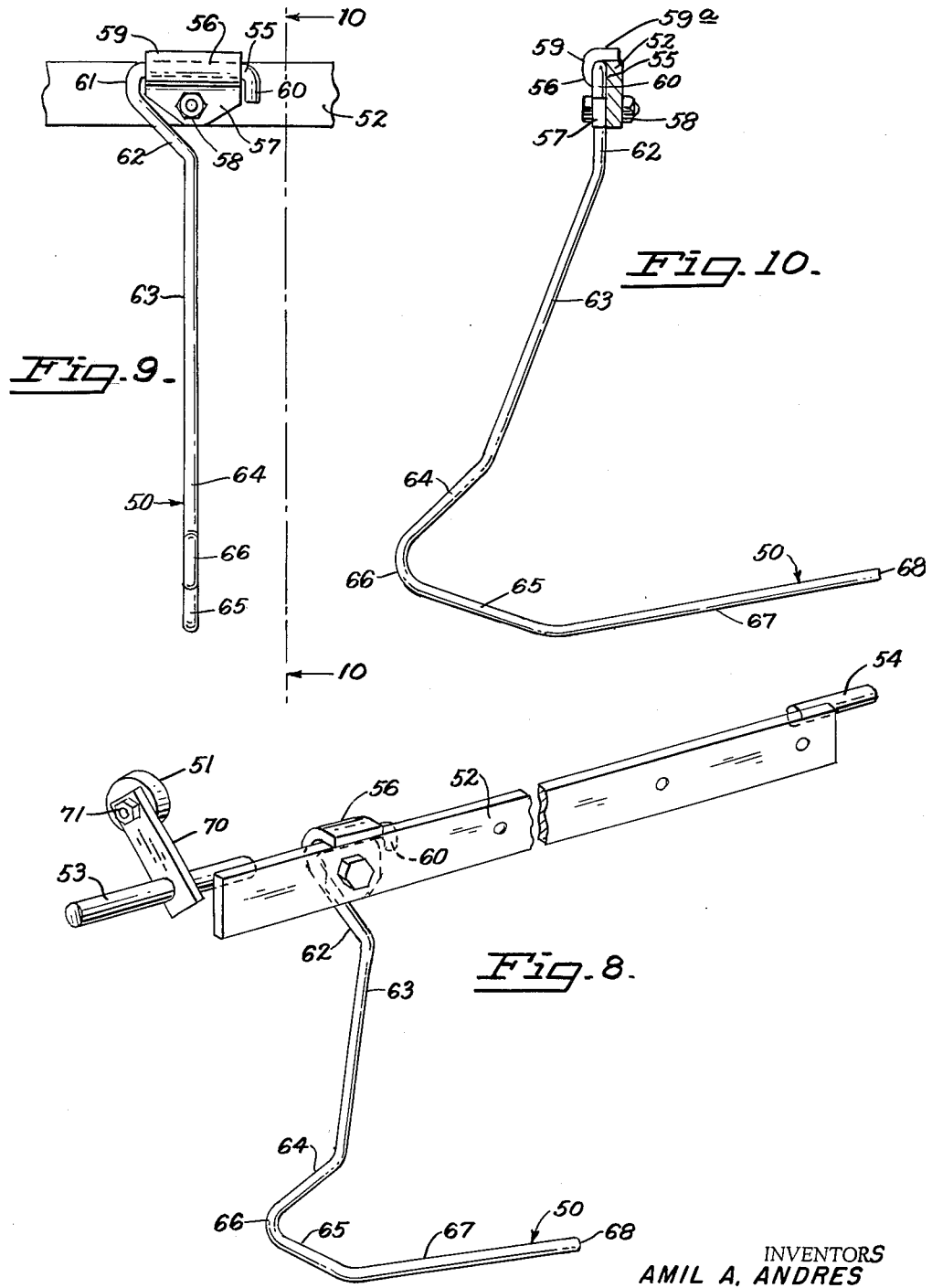

Feb. 22, 1966   L. W. GATES ETAL   3,236,038
ROTARY PICKUP FOR TOMATO HARVESTER
Filed April 8, 1964   7 Sheets-Sheet 7

INVENTORS
AMIL A. ANDRES
LAUREN W. GATES
BY
Owen, Wickersham & Erickson
ATTORNEYS United States Patent Office 3,236,038
Patented Feb. 22, 1966

3,236,038
ROTARY PICKUP FOR TOMATO HARVESTER
Lauren W. Gates, Rio Vista, and Amil A. Andres, Stockton, Calif., assignors to The Regents of the University of California, Berkeley, Calif.
Filed Apr. 8, 1964, Ser. No. 358,171
7 Claims. (Cl. 56—364)

This invention relates to improvements in harvesters and similar devices and more particularly to improvements in the pickup portion of the harvester.

While its use will be described particularly in connection with the harvesting of tomatoes, for which it is quite useful, the device is also useful for other crops that have been cut and where it is desired to pick up the crop and deposit it on an elevating device or conveyor. In tomato harvesting, for example, the plant is severed at or below the ground, and then the plant is lifted and carried to a station where the tomatoes are separated from the plant, the plant later being returned to the ground.

The present invention is used to lift such objects as tomato plants from the surface upon which they rest or grow and to deposit them upon a platform, conveyor, or other device and to do so gently and carefully. It is important in handling tomato plants during this harvesting operation, for example, that the tomatoes not be shaken off the plant prematurely, that is, that they be lifted gently so that the tomatoes do not fall to the ground but rather stay on the plant until they reach the separation station.

There are also problems in such harvesters as tomato harvesters with devices which come from below the plant and lift it up, for they carry a large amount of dirt with the plant, and this dirt must subsequently be separated out and discarded. When the dirt is wet and muddy, it tends to resist easy separation and causes trouble in various parts of the apparatus, reducing the efficiency of the operation.

One of the objects of the present invention is to provide a device for picking several plants off the ground gently and carefully without injecting any mechanism beneath the plant.

Another object is to provide a large degree of protection for plant material being lifted off the ground.

Another object is to achieve pickup of a severed plant and deposit it on a conveyor or the like without causing the severed plant to roll on the ground ahead of the harvester.

Another object of the invention is to avoid high unit pressures on easily damaged produce by engaging and lifting the plant, the produce being carried by the plant, rather than engaging both the plant and the produce with the lifting device.

Other objects and advantages of the invention will appear from the following description of a preferred embodiment thereof.

In the drawings:

FIG. 2 is a fragmentary top plan view of the device of FIG. 1 broken in the center to conserve space.

FIG. 3 is a view in front elevation and partly in section of the pickup unit of this invention.

FIG. 4 is an enlarged fragmentary view of a portion of the interior of the pickup drum showing the tine bars, tine cam, and some of the tines.

FIG. 8 is a view in perspective, broken in the middle to conserve space, of one tine bar, but showing only one of the many tines which are mounted thereon.

FIG. 9 is a view in front elevation of one tine and the adjacent portion of the tine bar.

FIG. 10 is a view in side elevation and in section taken along the line 10—10 in FIG. 9.

Figure 1:
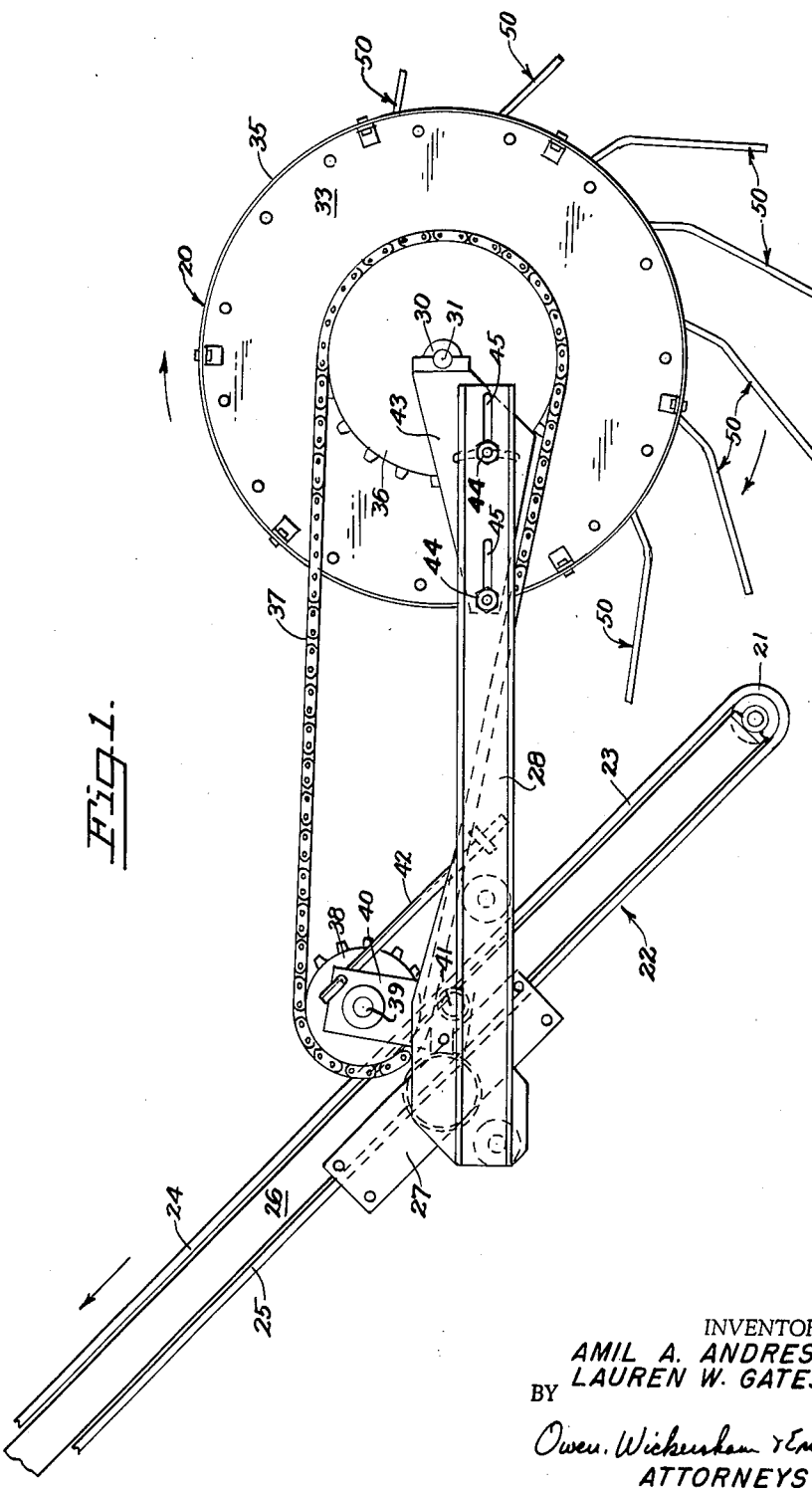
FIG. 1 is a view in side elevation of a front portion of a harvester incorporating the present invention, showing the pickup device of this invention located closely adjacent to, slightly forward of, and above the lower end of, an elevating conveyor.

The invention may be used on a harvester 15 having a main frame 16 and ground-engaging wheels 17 and 18.

The invention is characterized by the use of a novel pickup drum 20 which is located generally forwardly of and above the forward and lower end 21 of an elevator, conveyor, or other such device 22 on which the plant or such material is to be deposited. The elevator 22 may, for example, be mounted on the front end of a tomato harvester, bean harvester, or other type of agricultural implement. It may comprise a flighted or unflighted conveyor 23 with the upper reach 24 moving rearwardly and upwardly and the lower reach 25 moving forwardly and downwardly.

The elevator or conveyor 22 has a frame 26 which is supported by or forms part of the main frame of the harvester. The frame 26 may have a support bracket 27 on each side thereof to which a subframe 28 is joined. The subframe 28 provides at its front end a pair of clamps 30 in which a shaft 31 is secured. The drum 20 comprises a pair of end discs or plates 33 and 34 joined by a cylindrical shell 35 and journaled on the shaft 31 for rotation of the drum 20. A sprocket wheel 36 is rigidly mounted on one end plate 33 and is driven by a chain 37 from a sprocket wheel 38 that is mounted on a shaft 39. The shaft 39 is journaled in a bracket 40 which is pivotally mounted on a shaft 41 carried by the subframe 28, a turnbuckle bolt 42 being provided to adjust tightness of the chain 37. The position of the clamps 30 and hence of the drum 20 can be adjusted forward and back by means of movable brackets 43 each carrying a clamp 30 secured to the frame 28 by an arrangement of bolts 44 and slots 45. Thus the drum 20 is positively rotated in the same direction as the ground-engaging wheels 17 and 18 while being held above ground level at a desired height by the frame 28 and at a proper distance forward of and above the front end 21 of the conveyor 23. The rotation is preferably at a tine-tip speed slightly faster than the ground speed of the harvester.

As shown in FIG. 2, the drum shell 35 has a plurality of openings 46, 47, 48, and 49. Tines 50 project out through the openings 46, 47, and 48, while portions of cam-following rollers 51 project out through the openings 49. The openings 46, 47, and 48 are arranged in rows and the openings 47 in one row are offset circumferentially from alignment with the openings 46 and 48 of both the succeeding and preceding rows. In the form of the invention shown, every third row of openings is in line, but the offsetting may provide for more or less frequent repetition of rows. The openings 49 are in a single circumferential ring at one end of the drum 20, preferably near the plate 34 at the opposite end from the sprocket wheel 36.

The tines 50 are individually pivoted to tine bars 52, there being one tine 50 for each opening and one tine bar 52 for each row of openings. Each tine bar 52 is a flat steel bar to each end of which is rigidly secured a round stub shaft 53, 54. Each tine 50 is provided with a transverse extending end portion 55 which is pivoted to the tine bar 52 by a bracket 56 having a flat plate portion 57 held against the bar 52 by a bolt 58, a cylindrical sleeve portion 59 in which the portion 55 is rotatably mounted, and a tongue 59a which aligns the end portion 55 with the tine bar 52 by engaging the edge of the bar 52. (See FIGS. 9 and 10).

The tines are preferably shaped as shown in the drawings with short axial locking portions 60 and 61 at opposite ends of the portion 55, and the portion 61 is followed by an angular inset portion 62 to set the rest of the tine 50 in the radial plane of the center of its pivoted portion 55. As shown in FIGS. 9 and 10, the tine 50 is bent to provide a generally radially extending portion 63 which also extends out from the plane of the tine bar 52, a second more acute cam-follower portion 64 meeting a nearly tangential portion 65 at an acute vertex-like portion 66. The tangential portion 65 is followed by a bent back finger portion 67 terminating in an outer end 68. The portion 67 does the actual picking up.

Figure 5:
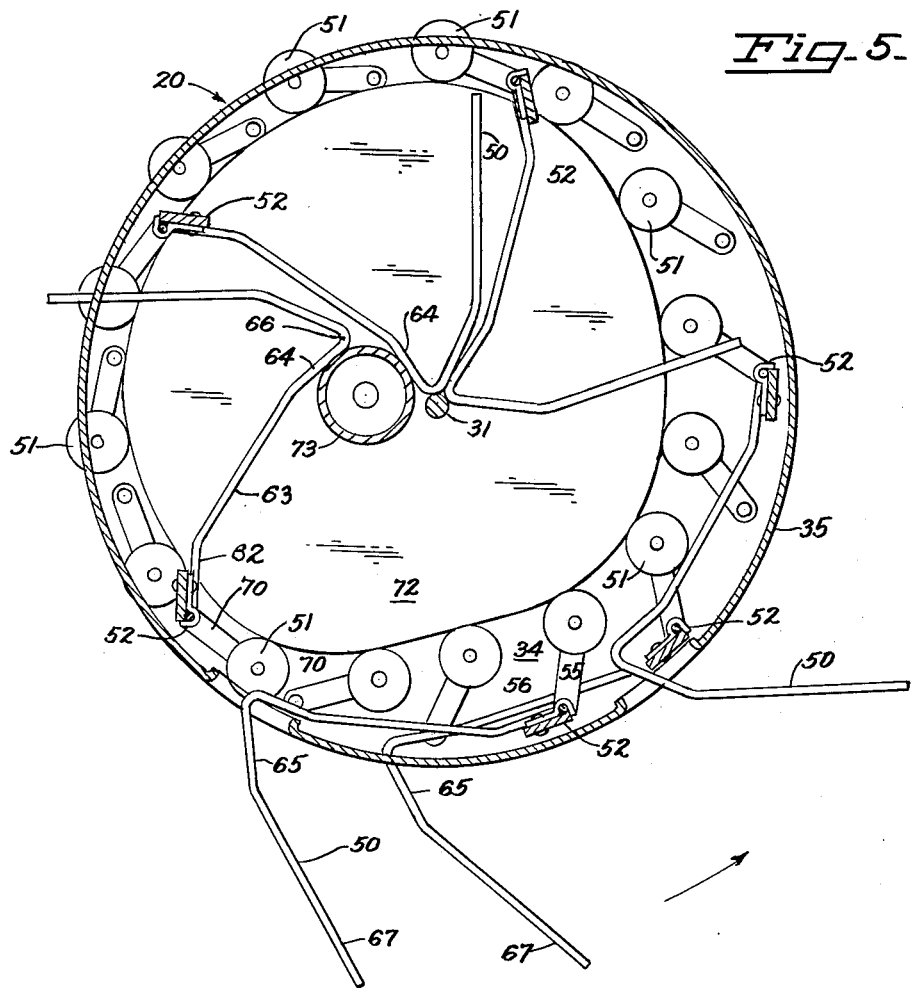
FIG. 5 is a view in elevation and in section taken along the line 5—5 in FIG. 3 but showing only tine bars and tines for one-third of the rows of tines, in order to clarify the construction.
Figure 6:
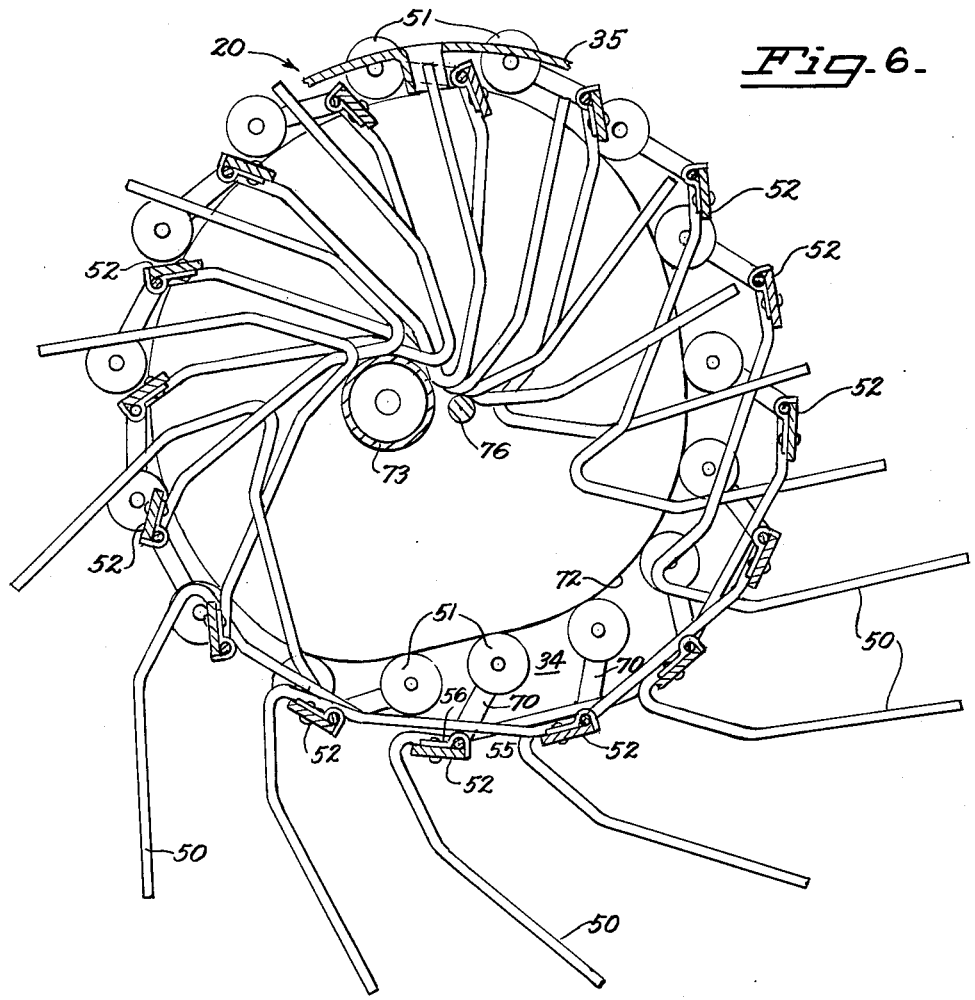
FIG. 6 is a view similar to FIG. 5 taken along the line 6—6 in FIG. 3, but showing tines for every row.
Figure 7:
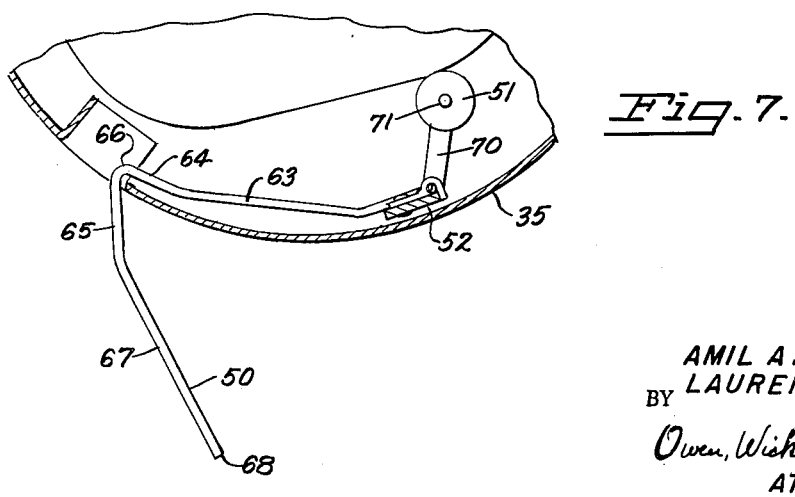
FIG. 7 is a fragmentary view in elevation and in section of a small portion of the drum as in FIGS. 5 and 6 but showing only one tine and showing it in relation to tht drum and cam.

Rigidly secured to the tine bar stub shaft 53 (see FIG. 8) is a short radially extending bar 70 at the outer end of which is rotatably mounted the cam follower 51, by means of a short stub shaft 71. The cam followers 51 engage a tine-bar cam 72 (see FIGS. 3, 5, and 6) which is shaped in a closed curve and is mounted on the shaft 31 so that the cam 72 is stationary relative to the frame 28 and does not rotate with the drum 20. The rotatably mounted tine bars 52 are turned around in accordance with the pattern of the tine bar cam 72 due to the following action of the cam followers 51. It will be noted that the tine bars 52 lie closely adjacent to the shell 35 and that the shape of the tines 50 is such that those at the top of the drum 20 are fully retracted by gravity and lie within the shell 35, whereas in their lower positions, particularly when they are moving in their downward path on the forward side of the drum 20, the tine portions 67 and 65 are projected out by gravity.

In the stage from their movement from the top of the drum 20 to the bottom of the drum 20, the tines 50 are projected out into their plant-engaging position not only by gravity but also by engagement of their cam follower portions 64 with a tine cam 73. The tine cam 73 may comprise a circular elastomer-coated roller rotatably mounted on bars 74 and 75 that are secured to the shaft 31 independently of the drum 20. Rotation of the roller cam 73 by the passing of the tines 50 over it reduces wear, quiets the action and reduces friction forces. The tine cam 73 is offset relative to the center of the drum, so that all parts of it lie to the forward side of the center 76 (see FIG. 6). During the downward portion of the drum cycle the cam 73 helps to project the tines 50 in a controlled manner at any desired time rather than waiting as long as would otherwise be necessary for gravity to project the tines 50 unassisted. The tines 50 are free floating in their pivot 56 and so will not puncture tomatoes but will rotate and yield.

Starting at the top and moving down to about 30° before the bottom of the drum 20, the tine bar cam is circular and generally concentric with the cylindrical shell 35, so that it exerts no effect during this time. From a point about 30° ahead of the nadir, however, the tine-bar cam 72 is shaped so that the cam follower 51 (being forced against the follower by the gravity reaction of the tines 50 on the tine bars 52) can displace inwardly to cause a controlled emergence of the tines 50 from the shell 35. In the lower portion, this effect is to enable full extension of the tines 50, and, then, as the bars 52 begin their upward cycle, to enable them to remain engaged with the plant material even though gravity would now tend to force them back into the shell 35. Further along, the tine-bar cam 72 controls and times the actual retraction of the tines 50 to pull them from the plant material and into the shell 35 at the desired time and to do so faster than gravity alone would pull them in.

In operation therefore, as the harvester moves over the ground, the front end 21 of the elevator 22 lies closely adjacent the ground, and the drum 20 is above it by about the projected length of the tines and forward of it by a little more than that, the entire drum 20 preferably being forward of the elevator 22. The drum 20 is positively rotated so that the tine bars 52, as well as the side plates 33 and 34 and shell 35, are being moved rotationally while the two cams 72 and 73 remain stationary, so far as rotation is concerned. Therefore, in accordance with this movement, the tine cam 73 and gravity act first to project the tines 50 on the forward half of their rotative cycle, moving them out so that they are lowered down into and engage the plants. Yet, there is nothing preventing the tines 50 from being pushed back up except the force of gravity, so that if they meet an obstruction, such as a tomato, instead of projecting through it, they are lightly mounted and therefore simply do not project out that far but stop and go down no further. This prevents damage to fruit. As they project into the plants, some tines 50 may meet resistance, but even then another tine 50 will fall down into a place there there is less resisance, so that several tines 50 get well into the plant, and then as the tines 50 are being moved upwardly on the rear half of the cycle, the tine-bar cam 72 holds them out until they have lifted up the plant to a desired height where it is deposited on the conveyor 23. Then the cam 72 retracts the tines 50, thereby disengaging them from the plant. The action is gentle, the plant is handled carefully, everything comes from above so that very little mud or dirt is picked up, only what has stuck to the plant itself, and the gentleness of the action prevents the fruit from being lost.

Figure 11:
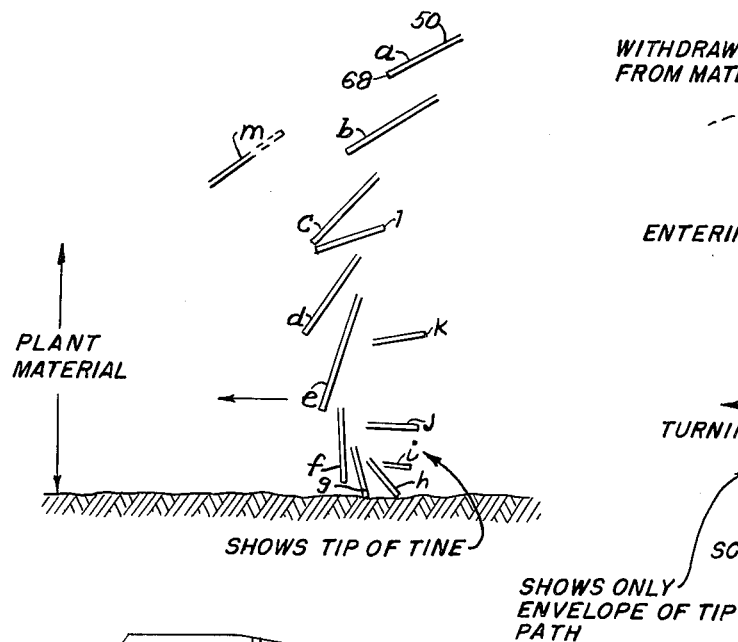
FIG. 11 is a diagrammatic view showing a number of successive positions of the end of a single tine in relation to the ground during operation.
Figure 12:
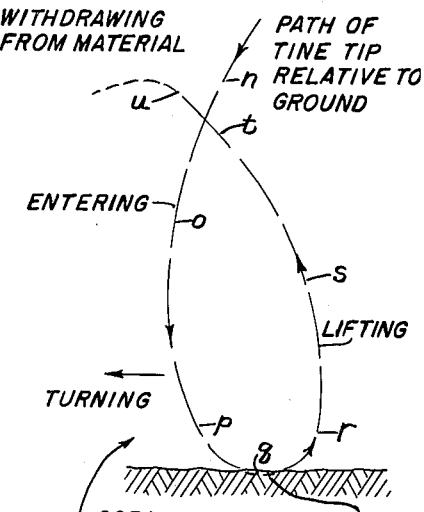
FIG. 12 is a similar diagrammatic view showing the envelope curve of the tip of the tine of FIG. 11.
Figure 13:
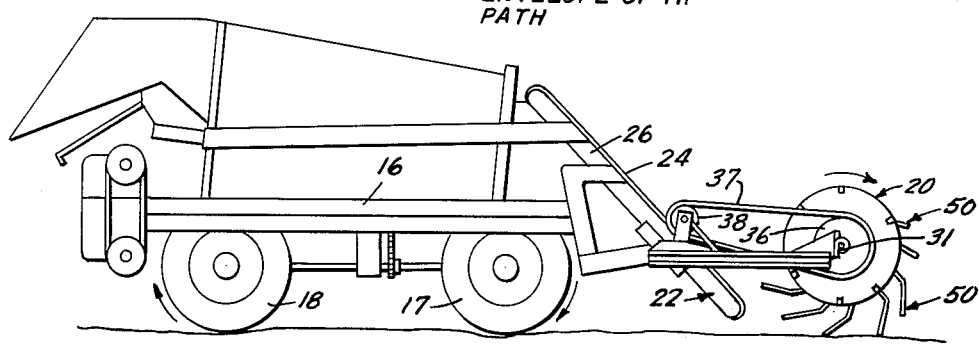
FIG. 13 is a simplified view in side elevation of a harvester incorporating the present invention.

FIGS. 11 and 12 indicate the novel action of the tine 50, showing in FIG. 11 the successive positions $a$, $b$, $c$, $d$, $e$, $f$, $g$, $h$, $i$, $j$, $k$, $l$, and $m$ of the end portion of a tine 50, near its tip 68, as seen from a fixed point on the ground over which the harvester is operating, and showing in FIG. 12 a curve representing the envelope of the path of the tip 68, having successive segments $n$, $o$, $p$, $q$, $r$, $s$, $t$, and $u$. The tine 50 drops down (positions $a$, $b$, and $c$ in FIG. 11; segment $n$ in FIG. 12) and enters the plant material essentially vertically and downwardly (positions $d$, $e$, and $f$; segments $o$ and $p$), scratching the ground slightly at $g$ and $q$. Then the tine 50 turns, within the plant material in such a manner that the tine tip assumes a supporting attitude (positions $g$, $h$, and $i$; segments $q$ and $r$). The slight movement of the tine relative to the plant material at this time also helps the tine to find a path through the plant material so that it may lift from the bottom, marking the soil slightly as it rotates and tightens into the plant. With the tine thus nearly horizontal, it lifts the plant onto the conveyor 23 (positions $j$, $k$, and $l$; segments $s$ and $t$) and is then withdrawn from the plant (position $m$, segment $u$), leaving the plant well up on the conveyor 23 and free to move on up it.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:
1. A pickup device for a tomato harvester having
    a conveyor frame at its forward end, said device comprising
    an upwardly and rearwardly inclined elevating conveyor supported by said conveyor frame with the forward end of said conveyor lying closely adjacent and above ground level and having an upwardly and rearwardly moving upper reach and a downwardly and forwardly moving lower reach, a sub-frame adapted to be secured to said conveyor frame and to extend forward of said conveyor, a drum supported rotatably by said sub-frame above and forward of said conveyor, said drum having a pair of end plates connected by a cylindrical shell having a plurality of tine openings, a stationary tine-bar cam disc supported by said sub-frame adjacent one end of said drum, means for rotating said drum so that the lower portion thereof moves toward said conveyor, a plurality of tine bars in said drum supported rotatably by said plates and spaced around in a circle near said shell, each tine bar having a cam follower that engages said tine-bar cam, and a plurality of tines freely pivotally mounted on each said tine bar, and each having a plant-engaging finger that is urged by gravity alone to project out through said tine openings and is retracted thereinto by the positive action of said tine-bar cam on said tine bars, said free pivotal mounting enabling the tine to retract when it meets obstructions to the degree that its projection is obstructed, whereby during harvesting said tines fall down into several plants, lift them gently onto said conveyor and are then positively detached from them by being withdrawn into said drum.

2. A pickup device for a crop harvester having an elevating conveyor at its forward end, inclined upwardly and rearwardly from a lower end adjacent ground level and having a conveyor frame, comprising a sub-frame adapted for support on each side of said conveyor by said conveyor frame and extending forward of said conveyor, and having at its forward end a transverse stationary shaft, a drum supported rotatably by said shaft fully above the ground level and forward of and above said conveyor and having a pair of end discs and a cylindrical shell rigidly joining said discs and provided with a plurality of rows of tine openings, the openings of each row being axially offset with respect to those of the preceding and succeeding rows, a tine-bar cam in said drum adjacent one end thereof supported non-rotatably by said shaft, a tine cam inside said drum and extending across it, mounted to said shaft and off-center with respect thereto, means for rotating said drum in the direction in which the lower portion thereof is moving toward the rear of said harvester, and a plurality of tine bars having their ends mounted rotatably in said discs at the same radius and closely adjacent to said shell, each tine bar having a radially offset cam follower engaging said tine-bar cam, each tine bar also having a main flat portion and a plurality of tines pivotally mounted on said flat portion and each having a hook-like shape with an outboard end that during rotation of said drum is cyclically caused by gravity to project out through said tine openings and is caused by said tine-bar cam to retract in through them at a cyclical position set by said tine-bar cam, said tine-bar cam meanwhile rotating said tine bars to swing said tines from an initial vertical position to a horizontal lifting position, said tine between its pivoted end and said outboard end having a finger portion and a tine-cam following portion that meet at an angle, said latter portion engaging with said tine cam during the upper forward part of the cycle.

3. The device of claim 2 in which said tine cam comprises a freely rotatable cylindrical roller engaged by and rotated by said tines.

4. A pickup device for a tomato harvester having a conveyor and a frame, comprising a sub-frame adapted for support by said frame adjacent said conveyor, and having at its forward end a transverse stationary shaft, a drum supported rotatably by said shaft fully above the ground level for delivering said crop to said conveyor and having a pair of end discs and a cylindrical shell rigidly joining said discs and provided with a plurality of rows of short tine openings, a tine-bar cam supported non-rotatably by said shaft, adjacent one end of said drum, means for rotating said drum in the direction in which the lower portion thereof is moving toward the rear of said harvester, and a plurality of tine bars having their ends mounted rotatably in said discs at the same radius and closely adjacent to said shell, each tine bar having mounted thereon a radially offset cam follower engaging said tine-bar cam, a plurality of tines pivotally mounted on said tine bar and each having a hook-like shape with an outboard end that during rotation of said drum is cyclically caused by gravity to project out in the direction of its own length through said tine openings and is caused by said tine bar cam to retract in through them in the direction of its own length at a cyclical position set by said tine-bar cam, said tine-bar cam meanwhile rotating said tine bars to swing said tines from an initial vertical position to a horizontal lifting position.

5. The device of claim 4 having a tine cam inside said drum and extending across it, mounted to said shaft and off-center with respect thereto, each said tine between its pivoted end and said outboard end having a finger portion and a tine-cam following portion that meet at an angle, said latter portion engaging with said tine cam during the upper forward part of the cycle.

6. The device of claim 4 wherein the openings of each row are axially offset with respect to those of the preceding and succeeding rows.

7. The device of claim 4 wherein said drum is supported by said shaft at such a height above ground level that the fully extended tines barely scratch the ground while moving rearwardly with respect to the ground.

References Cited by the Examiner

UNITED STATES PATENTS

| 69,045 | 9/1867 | Terrell | 56—364 |
|---|---|---|---|
| 1,170,616 | 2/1916 | Dintaman. | |
| 1,411,958 | 4/1922 | Dain | 56—364 X |
| 1,908,082 | 5/1933 | Tinsley | 56—364 |
| 2,388,212 | 10/1945 | McElhoe et al. | 56—364 |
| 2,417,309 | 3/1947 | Lisle et al. | 56—364 X |
| 2,732,672 | 1/1956 | Fleichman | 56—364 X |

FOREIGN PATENTS 772,625  4/1957  Great Britain.

ABRAHAM G. STONE, *Primary Examiner.*

RUSSELL R. KINSEY, ANTONIO F. GUIDA,
*Examiners.*